(12) United States Patent
Foltzer

(10) Patent No.: US 6,961,521 B1
(45) Date of Patent: Nov. 1, 2005

(54) METHOD AND APPARATUS FOR TRANSMITTING A BIT INTERLEAVED OPTICAL DATA STREAM ON AN OPTICAL NETWORK

(75) Inventor: Lawrence E. Foltzer, Occidental, CA (US)

(73) Assignee: Turin Networks, Petaluma, CA (US)

( * ) Notice: Subject to any disclaimer, the term of this patent is extended or adjusted under 35 U.S.C. 154(b) by 374 days.

(21) Appl. No.: 09/819,527

(22) Filed: Mar. 27, 2001

(51) Int. Cl.[7] .............................................. H04B 10/20
(52) U.S. Cl. ............................ 398/58; 398/61; 398/52; 398/91; 398/191
(58) Field of Search ............................... 398/72, 61, 47, 398/43, 100, 182, 58, 60, 66, 52, 191, 197; 370/509, 294

(56) References Cited

U.S. PATENT DOCUMENTS

| | | | | |
|---|---|---|---|---|
| 5,559,624 A | * | 9/1996 | Darcie et al. ................. | 398/72 |
| 5,581,387 A | * | 12/1996 | Cahill ......................... | 398/100 |
| 6,160,647 A | * | 12/2000 | Gilliland et al. .............. | 398/23 |
| 6,317,234 B1 | * | 11/2001 | Quayle ......................... | 398/9 |
| 6,594,043 B1 | * | 7/2003 | Bloom et al. ................ | 250/205 |
| 6,639,931 B1 | * | 10/2003 | Dowd et al. .................. | 372/96 |
| 2002/0080444 A1 | * | 6/2002 | Phillips et al. .............. | 359/125 |

* cited by examiner

*Primary Examiner*—David C. Payne
(74) *Attorney, Agent, or Firm*—Blakely, Sokoloff, Taylor & Zafman LLP

(57) ABSTRACT

A method and apparatus for transmitting a bit interleaved optical data stream on an optical network is disclosed. In one embodiment, the network includes multiple transmitters that are enabled to transmit an optical bit during established time slots that correspond to each transmitter. This allows those transmitters to create a bit interleaved optical data stream.

11 Claims, 3 Drawing Sheets

METHOD AND APPARATUS FOR TRANSMITTING A BIT INTERLEAVED OPTICAL DATA STREAM ON AN OPTICAL NETWORK

FIELD OF INVENTION

The invention is related to fiber optic transmission systems for a local telephony loop.

BACKGROUND OF THE INVENTION

Conventional fiber networks for local telephony receive data from local transmitters. Each of the local transmitters sends data frames that are time division multiplexed (TDM) onto the network. Each transmitter sends optical data using high power, and high cost, planar Fabry-Perot laser diodes. The high cost is due, in part, to the fiber alignment tolerances between the planar laser and the optical fiber.

A conventional fiber network allocates a portion of the upstream frame interval for transmission of initialization packets. The portion of the upstream frame interval allocated for initialization packets is usually equal to the round trip propagation time of the network. If the round trip time is long, the frame times must be extended, thereby increasing voice latency.

The conventional networks allow new transmitter nodes to be added to the network. When a new node is detected, a ranging algorithm is performed to determine where, physically and temporally, the node resides relative to a headend in the network. The new node is assigned a timer value, which it decrements with its local clock, to determine when to transmit. Because the timer must be able to build out the temporal position of the node over an entire frame time, and because the frame time is in part dependent on the round trip propagation time, the build out timer can get quite large depending on the temporal resolution requirements of the resulting system.

SUMMARY OF THE INVENTION

A method and apparatus for transmitting a bit interleaved optical data stream on an optical network is disclosed.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method and apparatus for transmitting a bit interleaved optical data stream on an optical network is disclosed. The bit interleaved optical data stream reduces the latency of voice signals, enables additional optical transmitters to be easily added to the optical network, and increases the power of the transmitted optical signals.

In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Figure 1:
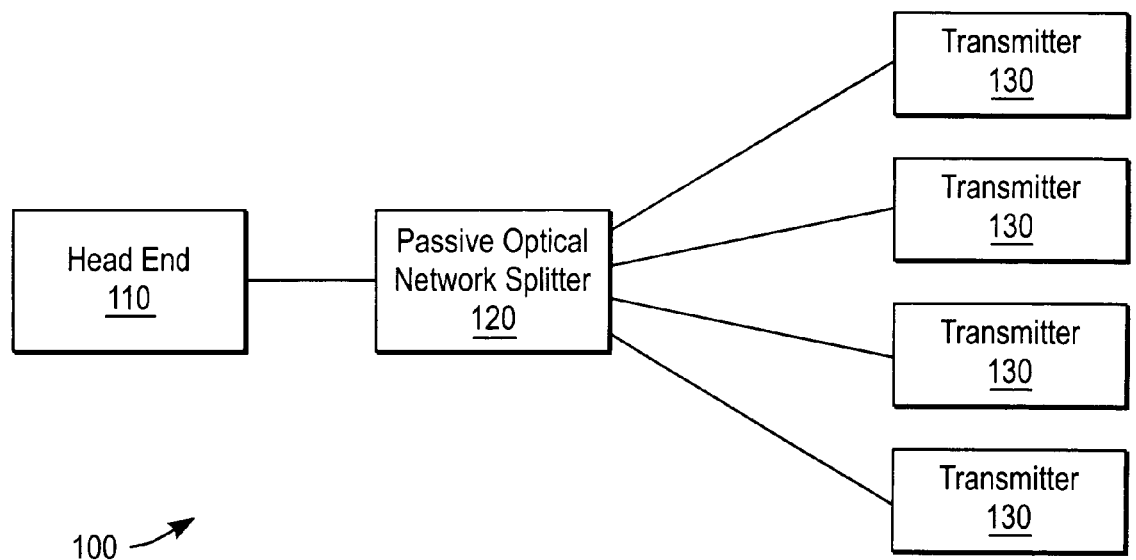
FIG. 1 shows an embodiment of an optical network that uses bit interleaving.

FIG. 1 shows an optical network 100 that includes a headend device, a passive optical network (PON) splitter 120, and multiple local pulse interleaved transmitters 130. Although four transmitters are shown, in alternate embodiments, network 100 may contain a greater or lesser number of such transmitters. Each local transmitter 130 may be used by a local entity, such as, for example, a home or office, to transmit data bits through the optical network to the headend. These upstream bits from the local transmitters are time division multiplexed (TDM) onto the network.

Figure 2:
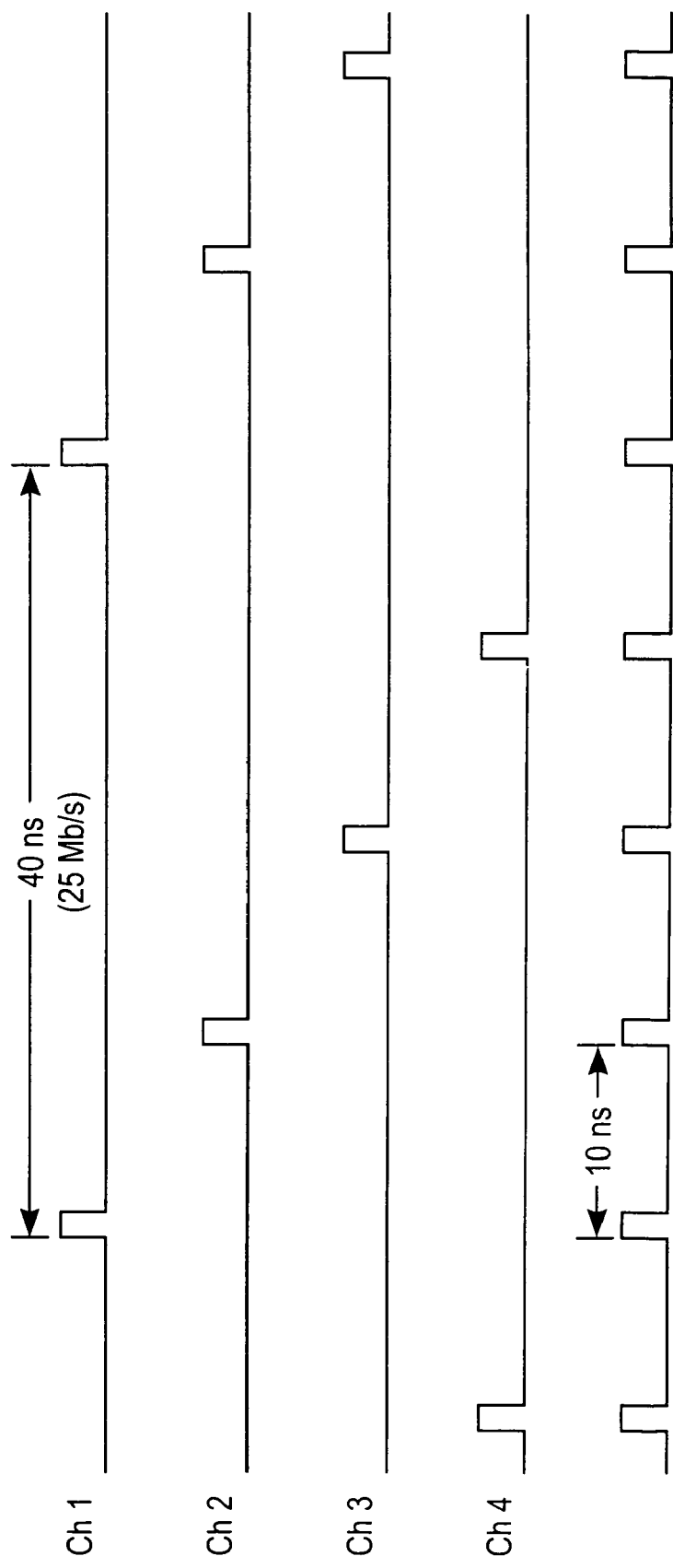
FIG. 2 shows an embodiment of the timing signals for bit interleaving.

In one embodiment, the bits are multiplexed by establishing transmission time slots for each of transmitters 130 to send data to the headend. The data bits from the several transmitters 130 are thus interleaved to form a continuous data bit stream. In one embodiment, the bits are bit interleaved as shown in FIG. 2. For example, if four transmitters are attached to the network, each transmitter may be assigned a 10 nano second (ns) time slot to transmit one bit of data. The bit may be transmitted by sending a 2.5 ns pulse onto the network. In this embodiment, each transmitter can send 25 mega bits per second (25 Mb/s) through the network.

The bit interleaved multiplexing may be enabled by using a vertical cavity surface emitting laser (VCSEL) in each local transmitter. The VCSEL-based transmitter enables light to be easily coupled from the VCSEL to the fiber, because their mode volumes, including surface area and emission angle, are closely matched. Furthermore, the VCSEL is not peak power limited in terms of its optical damage threshold. VCSEL cavity mirrors are distributed, rather than lumped as in Fabry-Perot devices. This prevents emission facet damage due to localized photon pressure. Therefore, the VCSEL can be driven to 100 milliwatt (mW) output power levels as long as the average power level is within acceptable limits that prevent burnout. The increased transmit power alone can contribute from 10 to 20 decibels (dB) increase in link power budget, while potentially keeping average power levels below the safe eye damage threshold. Also, return to zero (RZ) receivers are more sensitive than their non return to zero (NRZ) counterparts because signal amplitude grows linearly with the signal, while noise grows as the square root of the bandwidth required to process the signal. Thus, a 4 to 6 dB increase in receiver performance may be gained from bit interleaved multiplexing.

Thus, because bit interleaving is used rather than frame interleaving, the pulses from each transmitter node are temporally distributed to enable high peak power, low duty factor operation of the VCSELs. If a new transmitter node is added, the ranging needed to add the new node therefore only has to build out the internodal, interbit interval, which may be accomplished using a 3 or 4 bit counter with rapid convergence on time slot placement. Furthermore, because the duty factor is relatively low, the probability of collisions is small.

Figure 3:
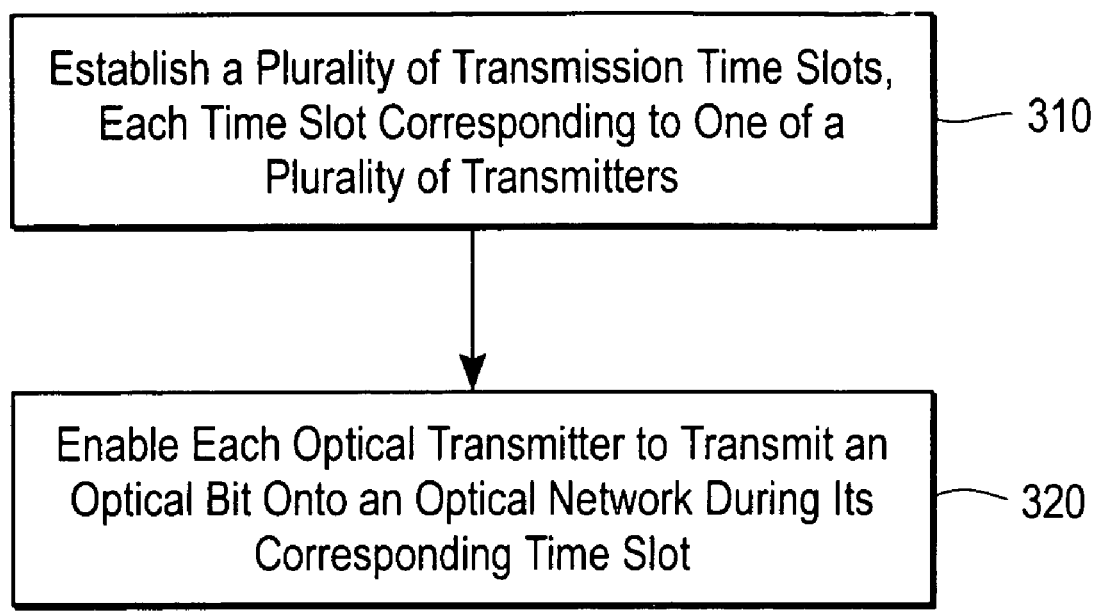
FIG. 3 is a flow diagram of one embodiment of a process for performing bit interleaving.

FIG. 3 is a flow diagram of one embodiment of a process for performing bit interleaving. Multiple transmission time slots are established, 310. Each time slot corresponds to one of multiple transmitters. Each optical transmitter is enabled to transmit an optical bit during its corresponding time slot, 320. The result is a continuous stream of bit interleaved optical data.

The bit interleaving enhances the optical power budget for upstream TDM burst mode transmission compared to conventional approaches. The bit interleaving also reduces packet collisions during node initialization. The bit interleaving also reduces temporal dynamic range for packet placement in slotted upstream TDM link.

These and other embodiments of the present invention may be realized in accordance with these teachings and it should be evident that various modifications and changes may be made in these teachings without departing from the broader spirit and scope of the invention. The specification and drawings are, accordingly, to be regarded in an illustrative rather than restrictive sense and the invention measured only in terms of the claims.

What is claimed is:

1. A method comprising:
    establishing a plurality of transmission time slots, each time slot corresponding to one of a plurality of optical transmitters coupled to a head end via an interleaving device;
    forming a bit interleaved optical data stream at the interleaving device based on a plurality of optical bits transmitted by the plurality of optical transmitters during a respective time slot associated with each of the optical transmitters, each of the optical transmitters transmitting only one optical bit to the interleaving device within each respective time slot, wherein each time slot has a duration of 10 nanoseconds (ns) and each optical bit is transmitted via a pulse having a pulse width of 2.5 ns; and
    transmitting the bit interleaved optical data stream from the interleaving device to the head end over an optical network, wherein a peak power of each pulse is higher than a predetermined threshold that would cause human eye damage while an average power of pulses in the bit interleaved optical data stream is below the predetermined threshold.

2. The method of claim 1 further comprising:
    enabling each of the plurality of optical transmitters to transmit an optical bit during its corresponding time slot.

3. The method of claim 2 further comprising:
    adding an additional optical transmitter to the optical network.

4. The method of claim 1 wherein at least one of the plurality of optical transmitters is a vertical cavity surface emitting laser.

5. A network comprising:
    a head end;
    an interleaving device coupled to the head end; and
    a plurality of transmitters coupled to the head end via the interleaving device, each of the plurality of transmitters are enabled to transmit an optical bit during an established time slot corresponding to said each transmitter to the interleaving device to create a bit interleaved optical data stream, wherein the bit interleaved optical data stream is transmitted from the interleaving device to the head end, wherein each transmitter transmits only one optical bit to the interleaving device within each respective time slot, wherein each time slot has a duration of 10 nanoseconds (ns) and each optical bit is transmitted via a pulse having a pulse width of 2.5 ns, and wherein a peak power of each pulse is higher than a predetermined threshold that would cause human eye damage while an average power of pulses in the bit interleaved optical data stream is below the predetermined threshold.

6. The network defined in claim 5 wherein at least one of the plurality of transmitters comprises a vertical cavity surface emitting laser.

7. An apparatus comprising:
    means for establishing a plurality of transmission time slots, each time slot corresponding to one of a plurality of optical transmitters coupled to a head end via an interleaving device;
    means for forming a bit interleaved optical stream at the interleaving device based on a plurality of optical bits transmitted by the plurality of optical transmitters during a respective time slot associated with each of the optical transmitters, each of the optical transmitters transmitting only one optical bit to the interleaving device within each respective time slot, wherein each time slot has a duration of 10 nanoseconds (ns) and each optical bit is transmitted via a pulse having a pulse width of 2.5 ns; and
    means for transmitting a bit interleaved optical data stream from the interleaving device to the head end over an optical network, wherein a peak power of each pulse is higher than a predetermined threshold that would cause human eye damage while an average power of pulses in the bit interleaved optical data stream is below the predetermined threshold.

8. The apparatus of claim 7 further comprising:
    means for enabling each optical transmitter to transmit an optical bit during its corresponding time slot.

9. The apparatus of claim 8 further comprising:
    means for adding an additional optical transmitter to the optical network.

10. The apparatus of claim 9, wherein at least one optical transmitter is a vertical cavity surface emitting laser.

11. A computer readable medium, which, when executed by a processing system, enables the system to perform:
    establishing a plurality of transmission time slots, each time slot corresponding to one of a plurality of optical transmitters coupled to a head end via an interleaving device;
    forming a bit interleaved optical stream at the interleaving device based on a plurality of optical bits transmitted by the plurality of optical transmitters during a respective time slot associated with each of the optical transmitters, each of the optical transmitters transmitting only one optical bit to the interleaving device within each respective time slot, wherein each time slot has a duration of 10 nanoseconds (ns) and each optical bit is transmitted via a pulse having a pulse width of 2.5 ns; and
    transmitting the bit interleaved optical data stream from the interleaving device to the head end over an optical network, wherein a peak power of each pulse is higher than a predetermined threshold that would cause human eye damage while an average power of pulses in the bit interleaved optical data stream is below the predetermined threshold.

* * * * *